US012737590B2

(12) United States Patent
Büchel et al.

(10) Patent No.: US 12,737,590 B2
(45) Date of Patent: Sep. 15, 2026

(54) ROUTING ACCELERATION IN MIXTURE OF EXPERTS ENSEMBLES

(71) Applicant: INTERNATIONAL BUSINESS MACHINES CORPORATION, Armonk, NY (US)

(72) Inventors: Julian Röttger Büchel, Zürich (CH); Irem Boybat Kara, Adliswil (CH); Abbas Rahimi, Rüschlikon (CH); Athanasios Vasilopoulos, Kilchberg (CH); Manuel Le Gallo-Bourdeau, Horgen (CH); Abu Sebastian, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 18/533,830

(22) Filed: Dec. 8, 2023

(65) Prior Publication Data

US 2025/0190755 A1 Jun. 12, 2025

(51) Int. Cl.
*G06N 3/045* (2023.01)

(52) U.S. Cl.
CPC .................................... *G06N 3/045* (2023.01)

(58) Field of Classification Search
None
See application file for complete search history.

(56) References Cited

U.S. PATENT DOCUMENTS 12,354,002 B1 * 7/2025 Weber .................... G06N 3/045
12,469,318 B2 * 11/2025 Yuan ...................... G06V 30/43
12,541,691 B2 * 2/2026 Fukuda .................. G06N 3/044
12,603,079 B2 * 4/2026 Su ......................... G10L 13/027
2018/0046916 A1 * 2/2018 Dally ...................... G06F 7/523
2019/0042538 A1 * 2/2019 Koren ..................... G06F 17/16
2022/0253680 A1 8/2022 Zhao
2023/0281510 A1 * 9/2023 Royer .................... G06N 3/084 706/12

(Continued)

OTHER PUBLICATIONS

Büchel, et al., "Function-Based Activation of Memory Tiers," Application and Drawings, Filed on Sep. 13, 2022, 56 Pages, Related U.S. Appl. No. 17/943,256.

(Continued)

*Primary Examiner* — Maikhanh Nguyen
(74) *Attorney, Agent, or Firm* — Robert D. Bean

(57) ABSTRACT

According to one embodiment, a method, computer system, and computer program product for routing acceleration in mixture of experts ensembles is provided. The present invention may include receiving input data at a router; generating a plurality of output vectors by applying a routing function to the input data, wherein each output vector is associated with one or more respective tiles or pairs of tiles in a plurality of MVM tiles; determining a plurality of sub-vectors in the output vectors, wherein each sub-vector in the plurality of sub-vectors is associated with a respective output vector in the plurality of output vectors, and merging the sub-vectors into an element vector; generating a probability distribution vector by applying a Softmax function to the element vector and determining the largest elements of the probability distribution; and configuring the router based on the one or more largest elements of the probability distribution.

17 Claims, 2 Drawing Sheets

(56) References Cited

U.S. PATENT DOCUMENTS

| | | | | |
|---|---|---|---|---|
| 2024/0096121 | A1* | 3/2024 | Yuan | G06V 10/467 |
| 2024/0233703 | A1* | 7/2024 | Su | G10L 13/027 |
| 2024/0386256 | A1* | 11/2024 | Thorp | G06N 3/084 |
| 2025/0217641 | A1* | 7/2025 | Mustafa | G06N 3/045 |

OTHER PUBLICATIONS

Chen, et al., "Learning to Screen for Fast Softmax Inference on Large Vocabulary Neural Networks," CoRR, Oct. 29, 2018, 13 pages, arXiv:1810.12406v1, Retrieved from the Internet: <URL: https://arxiv.org/abs/1810.12406>.

Liang, et al., "M3ViT: Mixture-of-Experts Vision Transformer for Efficient Multi-task Learning with Model-Accelerator Co-design," Advances in Neural Information Processing Systems, 2022, 17 pages, vol. 35, Retrieved from the Internet: <URL: https://papers.nips.cc/paper_files/paper/2022/hash/b653f34d576d1790481e3797cb740214-Abstract-Conference.html>.

Lu, et al., "NeuroSim Simulator for Compute-in-Memory Hardware Accelerator: Validation and Benchmark," Frontiers in Artificial Intelligence, Jun. 2021, 10 pages, vol. 4, Article 659060, DOI: 0.3389/frai.2021.659060, Retrieved from the Internet: <URL: https://www.frontiersin.org/articles/10.3389/frai.2021.659060/full>.

Sander, at al., "Fast, Differentiable and Sparse Top-k: a Convex Analysis Perspective," Proceedings of the 40th International Conference on Machine Learning, 2023, 18 pages, vol. 202, Honolulu, HI, USA, Retrieved from the Internet: <URL: https://proceedings.mlr.press/v202/sander23a>.

Shim, et al., "SVD-Softmax: Fast Softmax Approximation on Large Vocabulary Neural Networks," Advances in Neural Information Processing Systems, 2017, 11 pages, vol. 30, Retrieved from the Internet: <URL: https://papers.nips.cc/paper_files/paper/2017/hash/4e2a6330465c8ffcaa696a5a16639176-Abstract.html>.

Zhou, et al., "Mixture-of-Experts with Expert Choice Routing," 36th Conference on Neural Information Processing Systems (NeurIPS 2022), Oct. 14, 2022, 14 pages, arXiv:2202.09368v2, Retrieved from the Internet: <URL: https://arxiv.org/abs/2202.09368>.

* cited by examiner

ROUTING ACCELERATION IN MIXTURE OF EXPERTS ENSEMBLES

BACKGROUND

The present invention relates, generally, to the field of computing, and more particularly to deep neural network ("DNN") model systems.

Deep neural network model systems can comprise tiers of compute-in-memory structures that are configured to implement plural expert-sub models. Recent successes in deep learning have largely been achieved due to a scaling up of the number of training samples and parameters in a neural network. Currently, increasing the number of parameters to billions comes with a linear increase in the computation amount required to transform the outputs of a neural network into vectors of probabilities using the Softmax function. However, there exist plural expert-sub models denoted as Mixture of Experts ("MoE"), that can perform fast and energy-efficient inferences while scaling up to billions of parameters.

SUMMARY

Embodiments of a method, a computer system, and a computer program product for routing acceleration in mixture of experts (MoE) ensembles are described. According to one embodiment, a method, computer system, and computer program product for routing acceleration in MoE ensembles may include receiving input data at a router, wherein the router comprises a plurality of matrix-vector-multiplier (MVM) tiles; generating a plurality of output vectors by applying a routing function to the input data, wherein each output vector in the plurality of output vectors is associated with one or more respective tiles or pairs of tiles in the plurality of MVM tiles; determining a plurality of sub-vectors in the plurality of output vectors, wherein each sub-vector in the plurality of sub-vectors is associated with a respective output vector in the plurality of output vectors, and merging the plurality of sub-vectors into an element vector; generating a probability distribution vector by applying a Softmax function to the element vector and determining one or more largest elements of the probability distribution; and configuring the router based on the one or more largest elements of the probability distribution.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
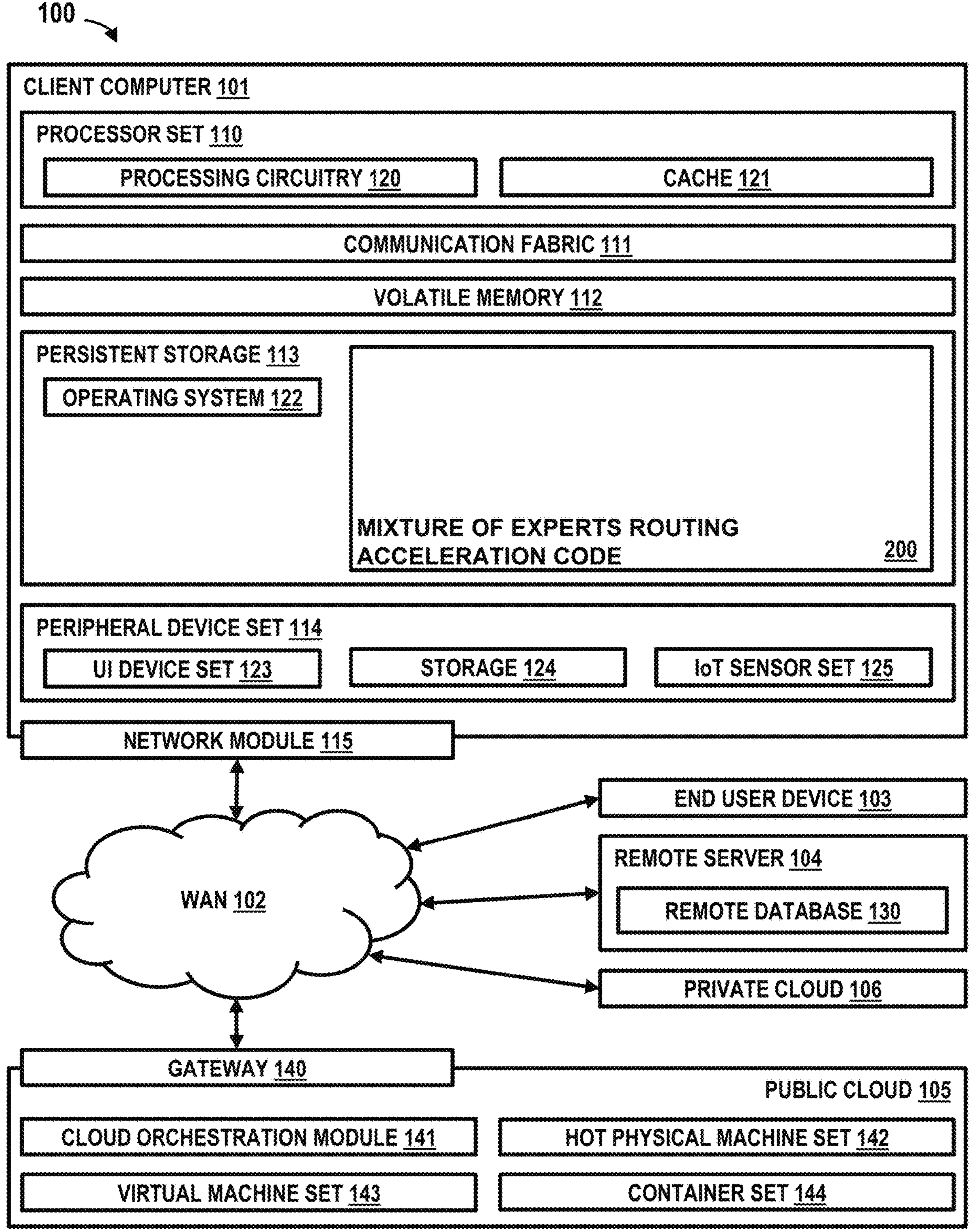
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate generally to the field of computing, in particular, to neural networks. The following described exemplary embodiments provide a method, program product, and system to, among other things, accelerate the routing in MoE ensembles via analogue in-memory computing and a hierarchical Softmax approximation. Therefore, the present embodiment has the capacity to improve computers and neural networks, specifically, the training of deep neural networks, by accelerating the routing in MoE ensembles via analogue in-memory computing ("AIMC") and a hierarchical Softmax approximation.

As previously described, DNN model systems can comprise tiers of compute-in-memory structures that are configured to implement plural expert-sub models, herein referred to as "experts". Experts are a plurality of neural networks that specialize in operating on certain inputs. Additionally, an expert can comprise one or more neural network layers. Recent successes in deep learning have largely been achieved due to a scaling up of the number of training samples and parameters in a neural network. Currently, increasing the number of parameters to billions comes with a linear increase in the computation amount required to transform the outputs of a neural network into vectors of probabilities using the Softmax function. However, there exist plural experts denoted as a MoE, that can perform fast and energy-efficient inferences while scaling up to billions of parameters. MoE is an ensemble learning technique in which experts in a MoE subnetwork are trained on subtasks of a predictive modeling problem so that each expert specializes in a specific sub-problem. In MoE systems, different experts, comprising one or more neural network layers, can process different parts of the data. What expert a piece of data is routed to is decided by a router, also referred to as a "router network" or a "neural network". A router, often a small neural network, is a gating function that passes each input data to one or more experts in a MoE subnetwork. The router ensures that each sub-problem in a predictive modeling problem is handled by the appropriate expert. Overall, MoE systems can handle complex classification tasks by the process of dividing a problem into smaller problems. Current methods perform routing in MoE by computing a Softmax on inputs, comprising vectors, to transform the vectors into probability distribution vectors, which relies on calculating the exponentials of the inputs. Computing the Softmax on the inputs requires using a look-up table in a digital processing unit to find a precomputed exponential value. However, as mentioned, the more parameters in a neural network, the greater the linear increase in the computation amount required to perform the routing process in MoE systems. Thus, a fast and energy-efficient implementation of the routing process using a mix of simple near-memory digital computing and analogue in-memory computing is needed.

Thus, embodiments of the present invention may provide advantages including, but not limited to, accelerating the routing in MoE ensembles via AIMC and a hierarchical Softmax approximation. The present invention does not require that all advantages need to be incorporated into every embodiment of the invention.

The embodiments mentioned in this paragraph are further illustrated and described below in the discussions of FIGS. 1 and 2. According to at least one embodiment, input data is received at a router, wherein the router comprises a plurality of matrix-vector-multiplier (MVM) tiles, also referred to as a "logical matrix" that can be utilized in the performance of Matrix-vector multiplications. According to at least one embodiment, a plurality of output vectors is generated by applying a routing function to the input data, wherein each output vector in the plurality of output vectors is associated with one or more respective tiles in the plurality of MVM tiles. According to at least one other embodiment, the plurality of MVM tiles comprise one or more MVM tiles in a single-layer MVM. According to at least one other embodiment, the plurality of MVM tiles comprise one or more pairs of MVM tiles in a multi-layer MVM. According to at least one embodiment, a plurality of sub-vectors, i.e., the top-k' element(s) of the output vectors, in the plurality of output vectors are determined, wherein each sub-vector in the plurality of sub-vectors is associated with a respective output vector in the plurality of output vectors. According to at least one embodiment, the plurality of sub-vectors are merged into an element vector by stacking the top-k' elements together. According to at least one embodiment, a probability distribution vector is generated by applying a Softmax function to the element vector. According to at least one embodiment, one or more largest elements, i.e., the top-k element(s) of the probability distribution vector, of the probability distribution are determined. According to at least one embodiment, the router is configured based on the one or more largest elements of the probability distribution.

The embodiments mentioned in this paragraph are further illustrated and described below in the discussions of FIGS. 1 and 2. According to at least one other embodiment, the router is initialized using pre-trained weights, retrained using the one or more largest elements of the probability distribution for one or more epochs to produce updated weights, and scaled using the updated weights. According to at least one other embodiment, the router is configured by determining a mean optimal scale of the router based on the mean of the one or more largest elements of the probability distribution and one or more approximated largest element values, and scaling using the mean optimal scale. According to at least one other embodiment, the routing function is executed using analogue in-memory computing. According to at least one other embodiment, applying the Softmax function, determining the plurality of sub-vectors in the plurality of output vectors, merging the plurality of sub-vectors into the element vector, and determining the one or more largest elements of the probability distribution is performed using a digital circuit.

The present invention may be a system, a method, and/or a computer program product at any possible technical detail level of integration. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product to receive input data at a router, wherein the router comprises a plurality of matrix-vector-multiplier (MVM) tiles, generate a plurality of output vectors by applying a routing function to the input data, wherein each output vector in the plurality of output vectors is associated with one or more respective tiles or pairs of tiles in the plurality of MVM tiles; determine a plurality of sub-vectors in the plurality of output vectors, wherein each sub-vector in the plurality of sub-vectors is associated with a respective output vector in the plurality of output vectors, and merge the plurality of sub-vectors into an element vector, generate a probability distribution vector by applying a Softmax function to the element vector and determine one or more largest elements of the probability distribution, and configure the router based on the one or more largest elements of the probability distribution.

Referring to FIG. 1, an exemplary networked computer environment 100 is depicted, according to at least one embodiment. Computing environment 100 contains an example of an environment for the execution of at least some of the computer code involved in performing the inventive methods, such as mixture of experts routing acceleration code 200, "the program". In addition to code block 200 computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Additionally, processing set 110 can comprise a compute-in-memory system. The CiM system can include but is not limited to a routing network, digital processors, memory, system communication bus, CiM device system, control unit, a MoE neural network/subnetwork, and CiM memory devices. The MoE subnetwork can comprise a plurality of expert neural networks that specialize in operating on certain inputs. An expert can comprise one or more neural network layers. The number of experts in the CiM system can vary and may be of a large quantity, such as a total of two thousand (2,000) experts. Specifically, the CiM system can comprise one or more digital processors, also referred to in whole as the digital circuit, that can issue control signals for controlling operations for many applications involving data stored at a non-volatile memory ("NVM") subsystem, including memory devices (e.g., dynamic random-access memory ("DRAM")) A system communication bus can shuttle data back and forth between the memory and the digital processors when performing operations (e.g., linear equation solver, optimization, deep Learning inference and training, Kalman filtering, sparse coding, temporal correlation detection, Fast Fourier Transforms). A CiM device system may comprise a control unit, such as a microprocessor, and associated computing circuitry used for controlling neural network operations (e.g., an in-place matrix-vector multiply operation can be connected to system communication bus). The CiM memory device can comprise a crossbar array of memory cells comprising a memory system associated with an expert within a MoE neural network model. The control unit can be configured to govern a computation path for performing CiM MoE neural network operations (e.g., input/output and/or computations).

Computer readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs, and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The database 130 may be a digital repository capable of data storage and data retrieval. The database 130 can be present in the remote server 104 and/or any other location in the network 102. The database 130 can store input data, top-k' elements, element vectors, top-k elements, MVM tiles and their weights, and scales. Additionally, the database 130 can comprise one or more neural networks, such as the MoE subnetwork and the router network. Also, the database 130 can comprise one or more experts.

According to the present embodiment, the mixture of experts routing acceleration program 200 may be a program capable of generating one or more output vectors by applying a routing function to input data, determining the top-k' element(s) of the one or more output vectors and generating a single element vector by connecting the top-k' elements, converting the element vector into a probability distribution vector using the Softmax function, and determining the top-k of the probability distribution vector. The program 200 may be located on client computing device 101 or remote server 104 or on any other device located within network 102. Furthermore, the program 200 may be distributed in its operation over multiple devices, such as client computing device 101 and remote server 104. The mixture of experts routing acceleration method is explained in further detail below with respect to FIG. 2.

Figure 2:
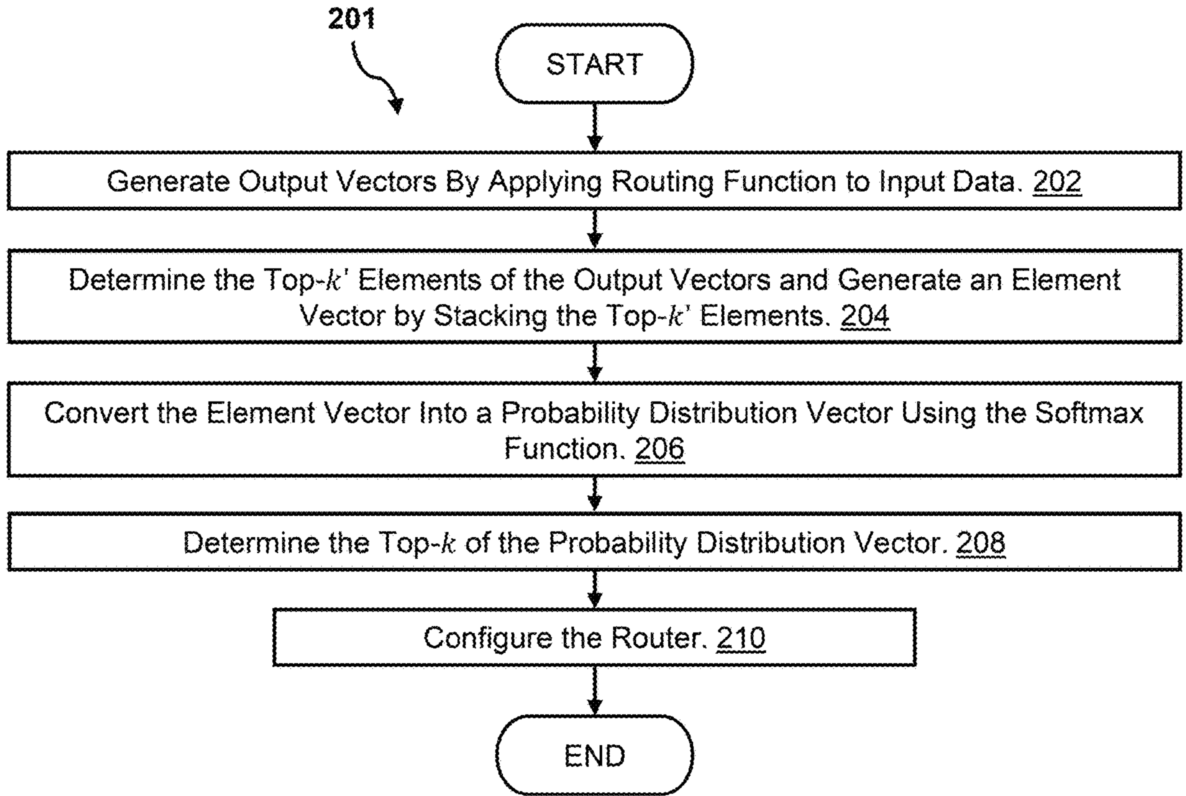
FIG. 2 is an operational flowchart illustrating a mixture of experts routing acceleration process according to at least one embodiment.

Referring now to FIG. 2, an operational flowchart illustrating a mixture of experts routing acceleration process 201 is depicted according to at least one embodiment. At 202, the program 200 can generate output vectors by applying a routing function to input data. The program 200 can send the input data into a router network, also referred to as "the router" or "the neural network". The router can comprise a single multi-layered deep neural network, such as a multi-layer perceptron ("MLP"). The MLP can comprise a matrix including sub-matrices, such as single-layer MVM tiles, or multi-layer MVM tiles chained together. As previously stated, an MVM tile can also referred to as a "logical matrix" and can be utilized in the performance of matrix-vector multiplications. The MVM tiles can comprise predefined weights. The input data can comprise a d-dimensional calibration vector. A variable number of dimensions to the input data can be represented by d. The d-dimensional input data can comprise any data that can be represented in vector form, such as images in image classification tasks or language texts in natural language processing and may also represent intermediate activations of the neural network.

The router can map the input data, such as an image, to an output vector using a routing function. The routing function can be implemented using analogue in-memory computing within the CiM system. The routing function can process the input d-dimensional input data in a tiled fashion, by splitting the d-dimensional input data into several sub-matrices of a certain dimension, for example, a dimension of 512×512, in the matrix within the router. The input data can be split into one or more single-layer MVM tiles or one or more multi-layer MVM tiles based on the size of the input vector, the size of the MVM tiles, and the size of the output vectors. For example, if the input data comprises two thousand forty-eight (2,048) input elements, such as pixels in an image, the router comprises MVM tiles of size 512×512, and the output sub-vectors will each comprise one thousand twenty-four (1,024) output elements, then the input elements can be split equally into a multi-layer MVM, comprising one pair of MVM tiles chained together and another pair of MVM tiles chained together, across a multi-layer MVM. Additionally, for example, if the input data comprises two thousand forty-eight (2,048) input elements, the router comprises MVM tiles of size 512×512, and the output vectors will each comprise five hundred twelve (512) output elements, then the input elements can be split equally into four (4) MVM tiles across a single layer MVM. The program 200 can perform matrix-vector multiplication across the matrix to generate sub-outputs of the input data from the one or more MVM tiles or the one or more pairs of MVM tiles. The program 200 can generate numerous output vectors, with each output vector comprising equal parts of the input data using the sub-outputs of the data from each of the one or more MVM tiles in a single-layer MVM or one or more pairs of MVM tiles in a multi-layer MVM.

At 204, the program 200 determines the top-k' element(s) of the output vectors and generates an element vector by stacking the top-k' elements. The program 200 can determine the top-k' elements of the output vectors from each of the one or more MVM tiles or one or more pairs of MVM tiles. The top-k' elements can comprise a subset of values from each of the one or more MVM tiles or one or more pairs of MVM tiles. The program 200 can perform sorting techniques, such as comparison-based algorithms, or searching techniques, such as binary searches, to find the largest k' values. For example, the program 200 may perform sorting techniques to list the elements of an output vector in descending order and print the largest top-k' elements in an array based on the numerical value to which k' is set. For example, if k'=2, the program 200 can print the two (2) largest elements in the output vector in an array. Continuing the previous example, the program 200 can generate a sub-vector of size k' using the two (2) largest elements in the output vector. The program 200 can implement the determination of top-k' element(s) locally using a fast digital circuit (i.e., digital processors 110). The program 200 can stack each of the sub-vectors of size k' together to form one (1) element vector using the digital circuit 110. Stacking can refer to a data structure containing a collection of objects, in this case, the sub-vectors of size k'. The element vector can comprise a shape of the total number of k' largest elements from each output vector, i.e., $$\mathrm{ceil}\left(\frac{E}{tilesize}\right) * k'$$

elements. For example, if k'=2 and the matrix comprises four (4) MVM tiles across a single layer MVM, then the top two (2) largest elements can be selected from each output vector, and the element vector can comprise eight (8) total elements.

At 206, the program 200 converts the element vector into a probability distribution vector, i.e., a numerical vector whose entries are real numbers between zero (0) and one (1), and in total, add up to one (1), using the Softmax function.

For example, in an image processing context, the probability distribution vector can comprise values that represent the probability that a brightness chosen from the region is less than or equal to a given brightness value. The program 200 can map the element vector to the Softmax function using a LookUp Table ("LUT") technique. The Softmax function can transform a $$\text{ceil}\left(\frac{E}{tilesize}\right) * k'\text{-dimensional vector},$$

i.e., the element vector, into a probability distribution vector. Specifically, the Softmax function can take as input a vector of k real numbers and normalize it into a probability distribution consisting of k possible outcomes. The program 200 can implement the Softmax function using the fast digital circuit 110. The Softmax function can be defined with the following formula:

$$\sigma(z)_i = \frac{e^{z_i}}{\sum_{j=1}^{k} e^{z_j}} \text{ for } i = 1, \ldots, k \text{ and } z = (z_i, \ldots, z_k) \in \mathbb{R}^k$$

The Softmax can be represented by σ. The input vector, i.e., the element vector, can be represented by z. The number of classes in the multi-class classifier can be represented by k. The standard exponential function for the element vector can be represented by $e^{z_i}$. The standard exponential function for the output vector, i.e., the probability distribution vector, $e^{z_j}$. By converting the element vector into a probability distribution vector using the Softmax function instead of converting the input calibration vector into a probability distribution vector using the Softmax function, the program 200 can perform less computations, i.e., for a calibration vector of size two thousand forty-eight (2,048) elements and an element vector of size eight (8) elements, the program 200 can convert a vector of size eight (8) elements into a probability distribution vector instead of a vector of size two thousand forty-eight (2,048) elements into a probability distribution vector.

At 208, the program 200 determines the top-k of the probability distribution vector. The program 200 can determine the top-k of the probability distribution vector by performing sorting techniques or searching techniques to find the largest top-k values as described above in Step 204. For example, the program 200 may perform sorting techniques to list the elements of the probability distribution vector in descending order and print the largest top-k elements, such as the largest brightness probabilities in the image processing context, in an array based on the numerical value to which k is set. For example, if k=2, the program 200 can print the two (2) largest elements in the probability distribution vector in an array.

At 210, the program 200 configures the router. In some embodiments, the program 200 may configure the router using a fixed mean optimal scale. The program 200 can generate a fixed mean optimal scale by passing training samples through the router during a training process. Training samples can comprise d-dimensional input data, such as calibration vectors representing images. The program 200 can generate the mean optimal scale (α) using the following formula:

$$\alpha = \left(\frac{\text{top-}k\ approx.}{\text{top-}k}\right) \cdot \text{mean()}$$

A top-k approximated value, also referred to as the "top-k approx. value" can comprise ground truth probabilities and can be represented by the top-k of the calibration vector. A top-k approximated value can be determined by converting an initial calibration vector into a probability distribution vector using the Softmax function. The program 200 can input the d-dimensional input data into the router, and the router can map the d-dimensional input data to a E-dimensional output vector, comprising a vector of E entries, using the routing function. The number of experts in the MoE subnetwork can be represented by E. The probability distribution vector may be generated using the same equation described above in Step 206 and can comprise transforming the E-dimensional output vector into a probability distribution vector. The program 200 can determine the top-k approx. value by determining the one or more largest top-k elements of the probability distribution vector based on the numerical value to which k is set; by performing sorting techniques or searching techniques to find the largest top-k values as described above in Step 204. For example, if k=10, the program 200 can select the ten (10) largest elements in the probability distribution vector. The program 200 can scale the router using the fixed mean optimal scale.

In some embodiments, the program 200 may configure the router by performing a fine-turning process. The program 200 can fine-tune the neural network using fine-tuning strategies, such as training the whole initialized neural network or freezing one or more layers of the neural network. For example, the program 200 can initialize the neural network using pre-trained weights. The program 200 can retrain the initialized neural network using previously determined top-k values for several epochs, resulting in the production of updated weights that account for approximation error. The program 200 can scale the router using the updated weights. Configuring the router using the generated updated weights in this method can result in improved downstream performance of the router.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for routing acceleration in mixture of experts (MoE) ensembles, the method comprising:

receiving input data at a router, wherein the router comprises a plurality of matrix-vector-multiplier (MVM) tiles;

generating a plurality of output vectors by applying a routing function to the input data, wherein each output vector in the plurality of output vectors is associated with one or more respective tiles or pairs of tiles in the plurality of MVM tiles;

determining a plurality of sub-vectors in the plurality of output vectors, wherein each sub-vector in the plurality of sub-vectors is associated with a respective output vector in the plurality of output vectors, and merging the plurality of sub-vectors into an element vector;

generating a probability distribution vector by applying a Softmax function to the element vector and determining one or more largest elements of the probability distribution; and configuring the router based on the one or more largest elements of the probability distribution, wherein configuring the router further comprises:

initializing the router using pre-trained weights;

retraining the router using the one or more largest elements of the probability distribution for one or more epochs to produce updated weights; and scaling the router using the updated weights.

2. The method of claim 1, wherein configuring the router further comprises:

determining a mean optimal scale of the router based on a mean of the one or more largest elements of the probability distribution and one or more approximated largest element values; and scaling the router using the mean optimal scale.

3. The method of claim 1, wherein the plurality of MVM tiles may comprise one or more MVM tiles in a single-layer MVM.

4. The method of claim 1, wherein the plurality of MVM tiles may comprise one or more pairs of MVM tiles in a multi-layer MVM.

5. The method of claim 1, wherein the routing function is executed using analogue in-memory computing.

6. The method of claim 1, wherein applying the Softmax function, determining the plurality of sub-vectors in the plurality of output vectors, merging the plurality of sub-vectors into the element vector, and determining the one or more largest elements of the probability distribution are performed using a digital circuit.

7. A computer system for routing acceleration in mixture of experts (MoE) ensembles, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving input data at a router, wherein the router comprises a plurality of matrix-vector-multiplier (MVM) tiles;

generating a plurality of output vectors by applying a routing function to the input data, wherein each output vector in the plurality of output vectors is associated with one or more respective tiles or pairs of tiles in the plurality of MVM tiles;

determining a plurality of sub-vectors in the plurality of output vectors, wherein each sub-vector in the plurality of sub-vectors is associated with a respective output vector in the plurality of output vectors, and merging the plurality of sub-vectors into an element vector, generating a probability distribution vector by applying a Softmax function to the element vector and determining one or more largest elements of the probability distribution; and configuring the router based on the one or more largest elements of the probability distribution, wherein configuring the router further comprises:

initializing the router using pre-trained weights;

retraining the router using the one or more largest elements of the probability distribution for one or more epochs to produce updated weights; and scaling the router using the updated weights.

8. The computer system of claim 7, wherein configuring the router further comprises:

determining a mean optimal scale of the router based on a mean of the one or more largest elements of the probability distribution and one or more approximated largest element values; and scaling the router using the mean optimal scale.

9. The computer system of claim 7, wherein the plurality of MVM tiles may comprise one or more MVM tiles in a single-layer MVM.

10. The computer system of claim 7, wherein the plurality of MVM tiles may comprise one or more pairs of MVM tiles in a multi-layer MVM.

11. The computer system of claim 7, wherein the routing function is executed using analogue in-memory computing.

12. The computer system of claim 7, wherein applying the Softmax function, determining the plurality of sub-vectors in the plurality of output vectors, merging the plurality of sub-vectors into the element vector, and determining the one or more largest elements of the probability distribution are performed using a digital circuit.

13. A computer program product for routing acceleration in mixture of experts ensembles (MoE), the computer program product comprising:

one or more computer-readable tangible storage medium and program instructions stored on at least one of the one or more tangible storage medium, the program instructions executable by a processor to cause the processor to perform a method comprising:

receiving input data at a router, wherein the router comprises a plurality of matrix-vector-multiplier (MVM) tiles;

generating a plurality of output vectors by applying a routing function to the input data, wherein each output vector in the plurality of output vectors is associated with one or more respective tiles or pairs of tiles in the plurality of MVM tiles;

determining a plurality of sub-vectors in the plurality of output vectors, wherein each sub-vector in the plurality of sub-vectors is associated with a respective output vector in the plurality of output vectors, and merging the plurality of sub-vectors into an element vector;

generating a probability distribution vector by applying a Softmax function to the element vector and determining one or more largest elements of the probability distribution; and configuring the router based on the one or more largest elements of the probability distribution, wherein configuring the router further comprises:

initializing the router using pre-trained weights;

retraining the router using the one or more largest elements of the probability distribution for one or more epochs to produce updated weights; and scaling the router using the updated weights.

14. The computer program product of claim 13, wherein configuring the router further comprises:

determining a mean optimal scale of the router based on a mean of the one or more largest elements of the probability distribution and one or more approximated largest element values; and scaling the router using the mean optimal scale.

15. The computer program product of claim 13, wherein the plurality of MVM tiles may comprise one or more MVM tiles in a single-layer MVM.

16. The computer program product of claim 13, wherein the plurality of MVM tiles may comprise one or more pairs of MVM tiles in a multi-layer MVM.

17. The computer program product of claim 13, wherein the routing function is executed using analogue in-memory computing and wherein applying the Softmax function, determining the plurality of sub-vectors in the plurality of output vectors, merging the plurality of sub-vectors into the element vector, and determining the one or more largest elements of the probability distribution are performed using a digital circuit.

* * * * *